United States Patent Office 3,106,551
Patented Oct. 8, 1963

3,106,551
PROCESSES OF TREATING WATER-SOLUBLE CELLULOSE DERIVATIVES CONTAINING HYDROXYETHYL GROUPS AND PRODUCT
Sven Lindenfors, Ornskoldsvik, Sweden, assignor to Mo och Domsjö Aktiebolag, Ornskoldsvik, Sweden, a corporation of Sweden
No Drawing. Filed May 23, 1961, Ser. No. 127,765
Claims priority, application Sweden May 31, 1960
11 Claims. (Cl. 260—232)

This invention relates to a process for treating water-soluble cellulose derivatives containing hydroxyethyl groups, such as hydroxyethyl cellulose, so as to increase their viscosity in aqueous solution, and to the water-soluble cellulose derivatives of increased viscosity produced by this process.

The viscosity of an aqueous solution hydroxyethyl cellulose can be correlated with the molecular weight, as in the case of other cellulose ethers, and this in turn is dependent on a number of factors, particularly the molecular weight or degree of polymerization of the starting cellulose used to prepare the hydroxyethyl cellulose, as well as the conditions of preparation and processing of the hydroxyethyl cellulose, and the resultant greater or lesser degree of degradation of the product. In many cases, it is desirable to prepare a hydroxyethyl cellulose which then dissolved in water gives a solution having a high viscosity, and to achieve this objective it is necessary to select a starting cellulose having a high molecular weight, and control the etherification and subsequent processing so as to minimize degradation. Even when this is done, however, a hydroxyethyl cellulose having the desirable high viscosity is not always obtained. In such cases, it would be desirable to increase the solution viscosity of an available hydroxyethyl cellulose to the desired value.

In accordance with the present invention, the solution viscosity of solid water-soluble cellulose derivatives containing hydroxyethyl groups, and particularly, hydroxyethyl cellulose, is increased by heating the material in solid form at a temperature within the range from about 80 to about 200° C. until the desired increased in viscosity is obtained. The time required to effect an increase in viscosity is inversely proportional to the temperature, longer times being required at low temperatures and shorter times at high temperatures, and the time will be selected in accordance with the temperature used to produce the desired increase in viscosity.

The heat-treatment of cellulose ethers is known to result in a decreased solution viscosity, due to degradation of the molecules. The fact that heating of water-soluble cellulose derivatives containing hydroxyethyl groups, such as hydroxyethyl cellulose, produces a reverse effect is therefore quite surprising. It is believed that the increase in viscosity is due to the formation of cross-linkages between adjacent molecules, resulting in the formation of ethylene bridges between the molecules. The ethylene bridges are connected to the cellulose through ether, acetal or ester linkages. Thus, the product of the invention is a hydroxyethyl cellulose derivative having cross-linkages in the form of $O-CH_2CH_2-O$ groups, as a result of which the solution viscosity of the starting water-soluble hydroxyethyl cellulose derivative is increased. The hydroxyethyl group of one anhydroglucose unit can form an ether group, with loss of one mole of water, with a hydroxy or hydroxyethyl group of an anhydroglucose unit of an adjacent molecule. In either case, the links are made of $-OCH_2CH_2O-$ groups.

The introduction of such cross links apparently proceeds only at temperatures of about 80° C. and above. No noticeable increase in solution viscosity is observed when the hydroxyethyl cellulose derivative is heated at 75° C. even for very long periods of time. At 80° C. up to about 100° C. a long heating time is required, usually of the order of 80 hours or more, in order to achieve a viscosity increase of at least about 20%, and such temperatures would normally therefore be used for increases of less than 20%. It is preferred to heat the hydroxyethyl cellulose at a temperature above 100° C. to obtain increases of 20% and more. At 100° C., a marked increase in viscosity can be obtained within a relatively short period of time. As the temperature is further increased, the increase in solution viscosity is obtained rather more rapidly. For example, at 140° C. the viscosity can be approximately doubled by a heat treatment of about 2 hours, and at 175° C. a viscosity increase of the same order can be obtained after only about 15 minutes.

In all cases, the temperature of treatment is below that at which degradation of the cellulose molecule becomes noticeable. Such degradation will counteract the desired viscosity increase, since it results in a reduction of molecular weight despite the formation of cross-links. Furthermore, even at low temperatures if the heating time is unduly long, degradation may take place. For example, at 125° C., viscosity reduction occurs after from about 6 to 72 hours, and at 140° C. after about 2 to 4 hours, and at 175° C. after about 30 minutes. Accompanying any reduction in viscosity due to degradation, there may also be acquired a decreased solubility in water.

At temperatures above 200° C., charring of the product may occur after a short period, and therefore the heating temperature is desirably below 200° C. Even at temperatures at 175° C., a brown color may be introduced into the product in some cases. Accordingly, it is generally preferred that the temperature of heating be below about 175° C.

The exact heating temperature and heating time will, of course, depend upon the hydroxyethyl cellulose derivative treated, and this is, in turn, dependent upon the molecular weight and the type of cellulose used as the starting material. However, by a suitable choice of temperature and treatment time within the stated ranges, it is possible to obtain an increase of solution viscosity for any water-soluble hydroxyethyl cellulose derivative to any desired value within a broad range. In most cases, it is quite easy to obtain an increase in viscosity of at least 20%, and increases of the order of from 30% to 250% and more are readily obtained by the process of the invention.

The hydroxyethyl cellulose derivative is heated in solid form. The heating can be carried out in conventional apparatus, preferably using closed ovens or like equipment. The heating can be effected by electricity, or by gas or other means. In order to minimize degradation at high temperatures, it may be desirable to heat the hydroxyethyl cellulose derivative in an inert atmosphere, such as nitrogen or carbon dioxide or even in vacuo, but it will ordinarily be found most convenient to heat the hydroxyethyl cellulose derivative in air. The hydroxyethyl cellulose derivative need not be in a fine state of subdivision, but a shredded or finely divided material is easier to handle, and will usually be the form in which the ether is treated. Commercially it will be found practical to carry out the heating in a system adapted for continuous operation, such as by disposing the hydroxyethyl cellulose derivative upon a conveyor belt which is passed through a heating oven at a rate such that the dwell time within the oven is the time required at the temperature used to effect the desired degree of solution viscosity increase.

The process of the invention is applicable to any water-soluble cellulose derivative containing hydroxyethyl groups, referred to generally herein as "hydroxyethyl cellulose derivative," such as not only hydroxyethyl cellulose, but also alkyl hydroxyalkyl cellulose ethers such as ethyl hydroxyethyl cellulose and methyl hydroxyethyl cellulose, mixed hydroxyalkyl cellulose ethers such as hydroxyethyl hydroxypropyl cellulose ethers, and also hydroxyethyl celluloses containing other substituent groups, such as carboxymethyl, sulfate, carboxyethyl, sulfoethyl and cyanoethyl groups. In some cases, cellulose derivatives containing substituents other than hydroxyethyl groups may be more sensitive to degradation at elevated temperatures than hydroxyethyl cellulose itself, and the temperature of heat treatment must be selected with this in mind.

The following examples represent in the opinion of the inventors preferred embodiments of their invention. In these examples the hydroxyethyl cellulose used was prepared in the following manner:

3800 grams of air-dry cellulose (alpha cellulose 90.6%) was mercerized in 19% aqueous sodium hydroxide for 60 minutes at 21–22° C. Aqueous sodium hydroxide was squeezed out for 20 minutes to a press factor of 2.68, whereupon the alkali cellulose was shredded in a Werner-Pfleiderer shredder for 30 minutes.

9920 grams of the alkali cellulose was charged into a 120 liter tumbling autoclave, which was evacuated, filled with oxygen-free nitrogen and evacuated once more. A mixture of 2610 grams of ethylene oxide and 9800 mls. of ethyl chloride were introduced into the autoclave, which was then heated to 50° C. for 75 minutes. The reaction was completed at 50° C. for 4 hours. The crude product was washed three times in methanol, neutralized with acetic acid, centrifuged and dried.

ANALYSIS

Salt content (sodium acetate) _ 0.7%.
Molecular substitution (average
  number of —CH$_2$CH$_2$O—
  groups per anhydroglucose
  unit) _____ 1.25.
Viscosity of 2% aqueous solution (based on an absolutely
  dry product) _____ 3530 cps. (Brookfield).
Clarity _____ 81.7% (Lumetron).

*Examples 1 to 21*

Portions of hydroxyethyl cellulose prepared as described above were filled into 21 open aluminum cans, and these cans were heated in an oven in air at the temperatures and for the times indicated in the table below. Each can after being removed from the oven was dried for 30 minutes in a vacuum desiccator over phosphorus pentoxide. Six grams of each dried sample was then dissolved in 294 grams of distilled water, and the viscosity and clarity measured. The viscosity was measured in a Brookfield viscosimeter, Type LVF, with spindle No. 3 and speed 12. Samples showing viscosities above 10,000 cps. with spindle No. 3 were remeasured with spindle No. 4, at a speed of 12.

Clarity was measured in a Lumetron, Model 402–E, in a 20 mm. thick layer, with filter M550, and 12 cm. spacing between the cuvette and the photocell.

The results obtained in this work are given in the following table. In each case, spindle 3 was used, unless indicated with a star (*), in which event spindle 4 was used.

| Example No. | Heat Treatment | | Viscosity (cps.) | Percent Increase in Viscosity | Clarity, Percent |
|---|---|---|---|---|---|
| | Temp., ° C. | Time (hours) | | | |
| 1 | 75 | 4 | 3,520 | 0 | 81.0 |
| 2 | 75 | 31 | 3,520 | 0 | 82.3 |
| 3 | 75 | 72 | 3,520 | 0 | 81.3 |
| 4 | 95 | 8 | 3,600 | 2 | 80.3 |
| 5 | 95 | 97 | 3,750 | 6 | 83.0 |
| 6 | 95 | 125 | 4,340 | 23 | 83.8 |
| 7 | 95 | 150 | 4,990 | 41 | 83.2 |
| 8 | 100 | 66 | 4,610 | 31 | 82.2 |
| 9 | 100 | 90 | 5,340 | 51 | 79.4 |
| 10 | 100 | 143 | 7,830 | 123 | 82.5 |
| 11 | 100 | 186.5 | 8,800 | 149 | 81.7 |
| 12 | 105 | 4 | 4,030 | 14 | 78.7 |
| 13 | 105 | 24 | 6,050 | 71 | 78.7 |
| 14 | 105 | 48 | 8,600* | 144 | 75.9 |
| 15 | 105 | 72 | 10,409* | 195 | 74.0 |
| 16 | 110 | 24 | 6,020 | 71 | 78.6 |
| 17 | 110 | 48 | 8,950* | 154 | 72.0 |
| 18 | 125 | 3 | 3,930 | 13 | 85.0 |
| 19 | 125 | 6 | 6,200 | 76 | 81.2 |
| 20 | 140 | 2 | 7,250* | 105 | 84.1 |
| 21 | 175 | 0.25 | 4,800 | 36 | 86.7 |

It is apparent from Examples 1 to 3 that heating at 75° C. for as long as 72 hours did not effect an increase in solution viscosity.

At 95° C. (Examples 4 to 7), an increase in solution viscosity was observed after 8 hours of heating. This increase became appreciable after 97 to 150 hours of heating.

A 5° C. increase in temperature, to 100° C. (Examples 8 to 11), considerably increased the rate of solution viscosity increase, and a further 5° C. increase, to 105° C. (Examples 12 to 15) gave an even greater solution viscosity. A similar effect is shown at 110° C. and 125° C. and 140° C. (Examples 16 to 20). Prolonged heating at 100° C., 105° C. and 110° C. gave very considerable increases in viscosity.

At 175° C. (Example 21), 15 minutes of heating gave an increase in viscosity which was obtained only after more than 66 hours at 100° C., and more than 125 hours at 95° C. Similarly, 2 hours at 140° C. (Example 20) gave an increase in viscosity which was obtained only after more than 100 hours at 100° C. These results emphasize the importance of the temperature on rate of viscosity increase.

The data also show that it is better, to minimize charring, not to heat for as much as 24 hours at temperatures above 100° C. Compare, for instance, Examples 14, 15 and 17, with Example 20, and Example 13 with Example 19.

In all cases, however, the clarity of the solutions was not greatly reduced.

*Example 22*

Examples 1 to 21 were repreated employing ethyl hydroxyethyl cellulose, and the ethyl hydroxyethyl cellulose was heated in an oven in air at temperatures ranging from 80 to 175° C. Viscosity increases of 5% and higher were observed.

*Example 23*

Examples 1 to 21 were repreated employing methyl hydroxyethyl cellulose, heating the cellulose derivative in an oven in air at temperatures ranging from 80° to 200° C. Viscosity increases of 5% and higher were observed.

I claim:
1. A process for treating a water-soluble cellulose derivative containing hydroxyethyl groups to increase its viscosity in aqueous solution, consisting essentially of heating the cellulose derivative in solid form at a temperature and time within the range from about 80° C. for at least 80 hours to about 200° C. for less than thirty minutes, the time being inversely proportional to the temperature, while controlling the temperature and time so that an over-all increase in solution viscosity is obtained, and recovering a cellulose derivative having a higher solution viscosity than the starting material.

2. A process in accordance with claim 1, in which the heating is carried out at a temperature within the range from about 100 to about 175° C.

3. A process in accordance with claim 1, in which the cellulose derivative is hydroxyethyl cellulose.

4. A process in accordance with claim 1, in which the cellulose derivative is ethyl hydroxyethyl cellulose.

5. A process in accordance with claim 1 in which the cellulose derivative is methyl hydroxyethyl cellulose.

6. A process in accordance with claim 1, in which the water-soluble cellulose derivative contains hydroxyethyl groups introduced by reaction with ethylene oxide in the presence of ethyl chloride.

7. A process in accordance with claim 6, in which the cellulose derivative is hydroxyethyl cellulose.

8. A process in accordance with claim 6, in which the cellulose derivative is ethyl hydroxyethyl cellulose.

9. A process in accordance with claim 6, in which the cellulose derivative is methyl hydroxyethyl cellulose.

10. A cellulose derivative prepared in accordance with the process of claim 1.

11. An aqueous solution consisting essentially of water and a cellulose derivative in accordance with claim 10.

References Cited in the file of this patent

Paist: "Cellulosics," New York, 1958, pages 71 to 73.

Textile Research Journal, vol. XXIX, No. 11, November 1959, pages 918 to 925.